United States Patent
Hoshi et al.

(10) Patent No.: US 9,322,082 B2
(45) Date of Patent: Apr. 26, 2016

(54) METHOD FOR RECOVERING RARE EARTH ELEMENT

(75) Inventors: Hiroyuki Hoshi, Osaka (JP); Atsushi Kikugawa, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 105 days.

(21) Appl. No.: 14/234,750

(22) PCT Filed: Jul. 27, 2012

(86) PCT No.: PCT/JP2012/069180
§ 371 (c)(1),
(2), (4) Date: Jan. 24, 2014

(87) PCT Pub. No.: WO2013/018710
PCT Pub. Date: Feb. 7, 2013

(65) Prior Publication Data
US 2014/0186239 A1 Jul. 3, 2014

(30) Foreign Application Priority Data

Jul. 29, 2011 (JP) .................................. 2011-166695
Dec. 28, 2011 (JP) .................................. 2011-287078

(51) Int. Cl.
| | |
|---|---|
| C22B 59/00 | (2006.01) |
| C22B 1/02 | (2006.01) |
| C22B 7/00 | (2006.01) |
| B09B 3/00 | (2006.01) |
| B09B 5/00 | (2006.01) |
| C22B 1/00 | (2006.01) |
| H01F 41/02 | (2006.01) |

(52) U.S. Cl.
CPC . *C22B 59/00* (2013.01); *B09B 3/00* (2013.01); *B09B 5/00* (2013.01); *C22B 1/005* (2013.01); *C22B 1/02* (2013.01); *C22B 7/001* (2013.01); *H01F 41/0253* (2013.01); *Y02P 10/214* (2015.11)

(58) Field of Classification Search
None
See application file for complete search history.

(56) References Cited

FOREIGN PATENT DOCUMENTS

| | | |
|---|---|---|
| CN | 1511966 A | 7/2004 |
| CN | 1605638 A | 4/2005 |
| JP | H2-22426 | 1/1990 |
| JP | 2002-60863 A1 | 2/2002 |
| JP | 2004-68082 A1 | 3/2004 |
| JP | 2009-249674 A | 10/2009 |
| WO | WO 2010/098381 A1 | 9/2010 |

OTHER PUBLICATIONS

First Office Action issued on Jan. 15, 2015 corresponding to Chinese patent application No. 201280038041.9.
International Search Report for International Application No. PCT/JP2012/069180 dated Oct. 23, 2012.

*Primary Examiner* — Melissa Swain
(74) *Attorney, Agent, or Firm* — Kratz, Quintos & Hanson, LLP

(57) ABSTRACT

An object of the present invention is to provide a method for recovering a rare earth element from a workpiece containing at least a rare earth element and an iron group element, which can be put into practical use as a low-cost, simple recycling system. The method of the present invention as a means for resolution is characterized by including at least a step of separating a rare earth element in the form of an oxide from an iron group element by subjecting a workpiece to an oxidation treatment, then turning the treatment environment into an environment where carbon is present, and subjecting the oxidation-treated workpiece to a heat treatment at a temperature of 1150° C. or more.

7 Claims, 3 Drawing Sheets

[Fig. 7]

METHOD FOR RECOVERING RARE EARTH ELEMENT

TECHNICAL FIELD

The present invention relates to a method for recovering a rare earth element from a workpiece containing at least a rare earth element and an iron group element, such as an R—Fe—B based permanent magnet (R is a rare earth element).

BACKGROUND ART

As is widely known, R—Fe—B based permanent magnets have high magnetic characteristics and thus are used in various fields today. Against such a background, in R—Fe—B based permanent magnet production plants, magnets are produced in large amounts every day. However, with an increase in the amount of magnets produced, the amount of magnet scrap discharged as a defectively processed product or the like, magnet processing waste discharged as cutting waste, grinding waste, or the like, etc., in the production process has also been increasing. In particular, with the weight and size reduction of information devices, the size of magnets used therein has also been reduced, leading to an increase in the proportion of processing allowance, and, as a result, the production yield tends to decrease year by year. Accordingly, rather than discarding magnet scrap, magnet processing waste, and the like discharged in the production process, how to recover and recycle metallic elements contained therein, particularly rare earth elements, is an important technical challenge for the future. The same also applies to how to recover rare earth elements from electrical appliances in which R—Fe—B based permanent magnets are used, etc., and recycle them as recyclable resources.

Several methods have been proposed as methods for recovering a rare earth element from a workpiece containing at least a rare earth element and an iron group element. For example, Patent Document 1 proposes a method in which a workpiece is heated in an oxidizing atmosphere to convert the contained metallic elements into oxides, followed by mixing with water to form a slurry; hydrochloric acid is added with heating to dissolve a rare earth element in a solution; an alkali (sodium hydroxide, ammonia, potassium hydroxide, etc.) is added to the obtained solution with heating, thereby precipitating the iron group element leached into the solution with the rare earth element; then the solution is separated from undissolved substances and the precipitate; and oxalic acid, for example, is added to the solution as a precipitant to recover the rare earth element in the form of an oxalate. This method is noteworthy as a method that allows a rare earth element to be effectively separated from an iron group element and recovered. However, the method has a problem in that because an acid and an alkali are used in part of the process, it is not easy to control the process, and also the recovery cost is high. Therefore, it must be said that in some aspects, the method described in Patent Document 1 is difficult to put into practical use as a recycling system that is required to be low-cost and simple.

In addition, as a method for not oxidizing an iron group element contained in a workpiece but oxidizing only a rare earth element contained in the workpiece to thereby separate the two, Patent Document 2 proposes a method in which a workpiece is heated in a carbon crucible. Unlike the method described in Patent Document 1, this method does not require an acid or an alkali. In addition, when a workpiece is heated in a carbon crucible, theoretically, the atmosphere in the crucible is autonomously controlled to an oxygen partial pressure at which iron group elements are not oxidized but only rare earth elements are oxidized. Accordingly, this method is likely to be more advantageous than the method described in Patent Document 1 in that the process is simpler. However, when it comes to the question whether the atmosphere in a crucible is autonomously controlled to a predetermined oxygen partial pressure by merely heating a workpiece in the carbon crucible, whereby rare earth elements can be separated from iron group elements, the reality is not necessarily so. Patent Document 2 states that the oxygen content of the atmosphere in a crucible is preferably 1 ppm to 1%, but essentially no external operation is required to control the atmosphere. However, according to the study by the present inventors, at least in the case where the oxygen content is less than 1 ppm, rare earth elements cannot be separated from iron group elements. Therefore, even if it is theoretically possible that when a workpiece is heated in a carbon crucible, the atmosphere in the crucible is autonomously controlled to an oxygen partial pressure at which iron group elements are not oxidized but only rare earth elements are oxidized, in reality, the inside of the crucible has to be artificially controlled to an atmosphere having an oxygen content of 1 ppm or more. Such control can be achieved by introducing an inert gas having an oxygen content of 1 ppm or more into a crucible, as also described in Patent Document 2. However, in the case of argon gas, which is widely used as an industrial inert gas, its oxygen content is usually 0.5 ppm or less. Therefore, for introducing argon gas having an oxygen content of 1 ppm or more into a crucible, the widely used argon gas cannot be directly used, and it is necessary to especially increase the oxygen content before use. Consequently, although the process of the method described in Patent Document 2 looks simple, actually it is not. It must be said that like the method described in Patent Document 1, in some aspects, the method described in Patent Document 2 is difficult to put into practical use as a recycling system that is required to be low-cost and simple.

PRIOR ART DOCUMENTS

Patent Document

Patent Document 1: JP-A-2009-249674
Patent Document 2: WO 2010/098381

SUMMARY OF THE INVENTION

Problems that the Invention is to Solve

Thus, an object of the present invention is to provide a method for recovering a rare earth element from a workpiece containing at least a rare earth element and an iron group element, which can be put into practical use as a low-cost, simple recycling system.

Means for Solving the Problems

In view of the above points, the present inventors have conducted extensive research. As a result, they have found that when an R—Fe—B based permanent magnet is subjected to an oxidation treatment, and then the treatment environment is turned into an environment where carbon is present, followed by subjecting the oxidation-treated magnet to a heat treatment at a predetermined temperature, the rare earth element contained in the magnet can be separated in the form of an oxide from the iron group element and recovered.

A method for recovering a rare earth element from a workpiece containing at least a rare earth element and an iron group element according to the present invention accomplished based on the above findings is, as defined in claim 1, characterized by including at least a step of separating a rare earth element in the form of an oxide from an iron group element by subjecting a workpiece to an oxidation treatment, then turning the treatment environment into an environment where carbon is present, and subjecting the oxidation-treated workpiece to a heat treatment at a temperature of 1150° C. or more.

A method as defined in claim 2 is characterized in that in the method of claim 1, in the heat treatment of the oxidation-treated workpiece in the presence of carbon, a carbon crucible is used as a treatment container and a carbon supply source.

A method as defined in claim 3 is characterized in that in the method of claim 1, in the heat treatment of the oxidation-treated workpiece in the presence of carbon, a carbon supply source is added to a non-carbon treatment container.

A method as defined in claim 4 is characterized in that in the method of claim 1, at least part of the workpiece is in granular or powder form having a particle size of 500 μm or less.

A method as defined in claim 5 is characterized in that in the method of claim 1, the workpiece is an R—Fe—B based permanent magnet.

A method as defined in claim 6 is characterized in that in the method of claim 5, the step of separating a rare earth element in the form of an oxide from an iron group element is followed by a step of reducing the boron content of the oxide of the rare earth element by subjecting the oxide of the rare earth element to a heat treatment together with a carbonate of an alkali metal in the presence of carbon.

Further, a method for reducing the boron content of a boron-containing oxide of a rare earth element according to the present invention is, as defined in claim 7, characterized in that a boron-containing oxide of a rare earth element is subjected to a heat treatment together with a carbonate of an alkali metal in the presence of carbon.

Effect of the Invention

According to the method for recovering a rare earth element from a workpiece containing at least a rare earth element and an iron group element of the present invention, a rare earth element can be separated in the form of an oxide from an iron group element by subjecting a workpiece to an oxidation treatment, then turning the treatment environment into an environment where carbon is present, and subjecting the oxidation-treated workpiece to a heat treatment at a predetermined temperature. Therefore, this method can be put into practical use as a low-cost, simple recycling system.

BRIEF DESCRIPTION OF THE DRAWINGS

FIG. 7 It shows the inside of a carbon crucible after the heat treatment of a non-oxidation-treated magnet in the presence of carbon in Comparative Example 1 (no mass is present).

MODE FOR CARRYING OUT THE INVENTION

Figure 1:
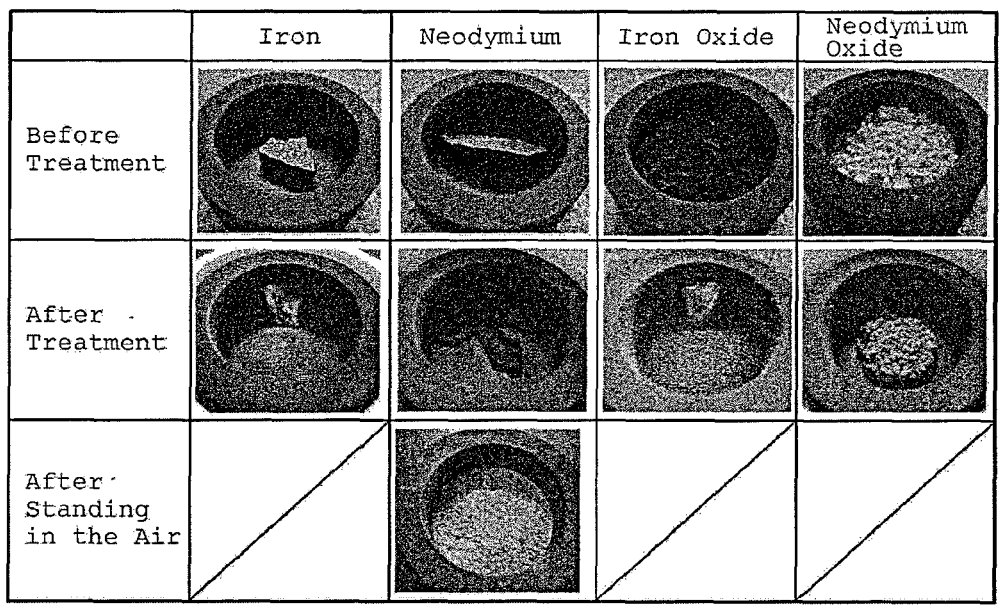
FIG. 1 It shows changes in appearance resulting from the heat treatment of iron, neodymium, iron oxide, and neodymium oxide each in the presence of carbon in Reference Example 1.

The method for recovering a rare earth element from a workpiece containing at least a rare earth element and an iron group element of the present invention is characterized by including at least a step of separating a rare earth element in the form of an oxide from an iron group element by subjecting a workpiece to an oxidation treatment, then turning the treatment environment into an environment where carbon is present, and subjecting the oxidation-treated workpiece to a heat treatment at a temperature of 1150° C. or more.

First, in the method of the present invention, the oxidation treatment of a workpiece intends to convert the rare earth element contained in the workpiece into an oxide. Unlike the method described in Patent Document 2, the oxidation treatment of a workpiece may also convert the iron group element contained in the workpiece into an oxide as well as the rare earth element. The oxidation treatment of a workpiece can be easily performed by heat-treating or burning the workpiece in an oxygen-containing atmosphere. The oxygen-containing atmosphere may be ambient atmosphere. In the case where the workpiece is heat-treated, it may be performed at 350° C. to 1000° C. for 1 hour to 5 hours, for example. In the case where the workpiece is burned, it may be performed by spontaneous ignition or artificial ignition, for example. In addition, the oxidation treatment of a workpiece may also be performed by an alkali treatment, in which the workpiece is oxidized in an aqueous alkali solution. Examples of alkalis that can be used for the alkali treatment include sodium hydroxide, potassium hydroxide, sodium hydrogen carbonate, sodium carbonate, and ammonia. In addition, the concentration of the aqueous alkali solution is 0.1 mol/L to 10 mol/L, for example. The treatment temperature is 60° C. to 150° C., for example. The treatment time is 1 hour to 10 hours, for example. As a result of the oxidation treatment of a workpiece in this manner, the oxygen molar concentration in the workpiece is 1.5 times or more the molar concentration of rare earth elements, whereby the rare earth element can be converted into an oxide more reliably. It is preferable that the oxygen molar concentration in the workpiece as a result of the oxidation treatment is 2.0 times or more the molar concentration of rare earth elements. In addition, it is preferable that the oxidation treatment of a workpiece is performed in the absence of carbon. This is because when the oxidation treatment of a workpiece is performed in the presence of carbon, the rare earth element contained in the workpiece may undergo an undesirable chemical reaction with carbon, thereby inhibiting the desired conversion into an oxide (thus, "in the absence of carbon" herein means that carbon that causes an enough chemical reaction to inhibit the conversion of the rare earth element contained in the workpiece into an oxide is not present).

Next, the oxidation-treated workpiece is moved to an environment in the presence of carbon and subjected to a heat treatment at a temperature of 1150° C. or more, whereby the rare earth element can be separated in the form of an oxide from the iron group element. This is based on the following phenomenon found by the present inventors: when an oxidation-treated workpiece is moved to an environment in the presence of carbon and subjected to a heat treatment at a temperature of 1150° C. or more while supplying carbon, an oxide of a rare earth element contained in the oxidation-treated workpiece melts in the form of an oxide at the high temperature, while an iron group element dissolves carbon to form an alloy and melts, or an oxide of an iron group element is reduced by carbon, then dissolves carbon to form an alloy, and melts; as a result, a melt of the oxide of a rare earth element and a melt of the alloy of an iron group element and carbon do not mix with each other, but are present independently of each other. The role of carbon is thus completely different from that in the method described in Patent Document 2, in which carbon is used not to oxidize an iron group element contained in a workpiece but to oxidize only a rare earth element contained in the workpiece. The reason why the temperature of the heat treatment of an oxidation-treated workpiece in the presence of carbon is specified to 1150° C. or more is that when the temperature is less than 1150° C., neither an oxide of a rare earth element nor an alloy of an iron group element and carbon melts. The temperature of the heat treatment of an oxidation-treated workpiece in the presence of carbon is preferably 1300° C. or more, more preferably 1350° C. or more, and still more preferably 1400° C. or more. Incidentally, in view of energy cost, for example, the upper limit of the heat treatment temperature is preferably 1700° C., more preferably 1650° C., and still more preferably 1600° C. The heat treatment time is suitably 10 minutes to 3 hours, for example. The carbon supply source to an oxidation-treated workpiece may have any structure and form, examples thereof including graphite (black lead or plumbago), charcoal, coke, coal, and diamond. However, it is advantageous to use a carbon crucible in the heat treatment, because the carbon crucible serves as a treatment container and also as a carbon supply source from the surface thereof (needless to say, this does not discourage the further addition of other carbon supply sources). In the case where a carbon crucible is used as a treatment container, the heat treatment of an oxidation-treated workpiece in the presence of carbon is preferably performed in an inert gas atmosphere such as an argon gas atmosphere (the oxygen content is preferably less than 1 ppm) or in vacuum (preferably less than 1000 Pa). This is because when the heat treatment is performed in an oxygen-containing atmosphere such as ambient atmosphere, oxygen in the atmosphere may react with carbon on the surface of the carbon crucible to form carbon dioxide, preventing the carbon crucible from efficiently serving as a carbon supply source. Incidentally, treatment containers that can be used are not limited to carbon crucibles as in the method described in Patent Document 2, and it is also possible to use a non-carbon treatment container, such as a ceramic crucible made of a metal oxide like alumina, magnesium oxide, or calcium oxide or silicon oxide (such a crucible may be made of a single material or a plurality of materials, and examples include those made of a material that contains elemental carbon but does not serve as a carbon supply source, such as silicon carbide). In the case where a non-carbon treatment container is used, the treatment container does not serve as a carbon supply source. Therefore, a carbon supply source is added to the treatment container to perform the heat treatment of an oxidation-treated workpiece. In addition, when an iron-making blast furnace, an electric furnace, a high-frequency induction furnace, or the like is used as a non-carbon treatment container, and charcoal, coke, or the like is used as a carbon supply source, a large amount of oxidation-treated workpieces can be subjected to a heat treatment at once. The amount of carbon supply source added is preferably 1.5 times or more the moles of the iron group element contained in the workpiece. By such adjustment of the amount of carbon supply source added, even when the iron group element contained in the workpiece is converted into an oxide as a result of the oxidation treatment, the reduction thereof can be ensured, and alloying with carbon can be allowed to proceed. Incidentally, in the case where a non-carbon treatment container is used, the heat treatment of an oxidation-treated workpiece in the presence of carbon may be performed in an inert gas atmosphere such as an argon gas atmosphere (the oxygen content is preferably less than 1 ppm) or in vacuum (preferably less than 1000 Pa), and may also be performed in an oxygen-containing atmosphere such as ambient atmosphere. In the case where the heat treatment of an oxidation-treated workpiece in the presence of carbon is performed in an oxygen-containing atmosphere, this is advantageous in that excess carbon supply source after the heat treatment reacts with oxygen in the atmosphere to form carbon dioxide and thus is discharged from the treatment container.

When an oxidation-treated workpiece is subjected to a heat treatment in the presence of carbon as above, whereby both an oxide of a rare earth element and an alloy of an iron group element and carbon melt, these melts do not mix with each other. Instead, because the former melt has a smaller specific gravity than the latter melt, it is present floating on the surface of the latter melt, and thus the two can be easily separated. In addition, when cooling is performed after the heat treatment, the melt of an oxide of a rare earth element and the melt of an alloy of an iron group element and carbon each form a mass adhering to the treatment container, and thus the two can also be separated in the form of masses. In addition, when the mass of an oxide of a rare earth element adhering to the treatment container and the mass of an alloy of an iron group element and carbon adhering to the treatment container are subjected to a heat treatment at a temperature of 1350° C. or more, both masses melt, and the latter melt forms a diffusion layer spreading over the surface of the treatment container, while the former melt is present floating on the surface of the latter melt. Thus, the former melt can be easily separated from the latter melt. In addition, utilizing this phenomenon, when a treatment container, which has adhering thereto a mass of an oxide of a rare earth element and a mass of an alloy of an iron group element and carbon, is heat-treated in an upside-down position in an inert gas atmosphere such as argon gas (the oxygen content is preferably less than 1 ppm) or in vacuum (preferably less than 1000 Pa) at a temperature of 1350° C. or more (the heat treatment time is suitably 10 minutes to 3 hours, for example), only the former melt can be allowed to drop down and thus separated from the latter melt. An oxide of a rare earth element recovered by separation from an alloy of an iron group element and carbon in such a manner can be reduced by molten salt electrolysis, for example, and thus converted into a rare earth metal.

Incidentally, the workpiece containing at least a rare earth element and an iron group element, to which the method of the present invention is to be applied, is not particularly limited as long as it contains a rare earth element, such as Nd, Pr, Dy, Tb, or Sm, and an iron group element, such as Fe, Co, or Ni, and, in addition to a rare earth element and an iron group element, additional elements such as boron may also be contained. Specific examples include R—Fe—B based permanent magnets. The size or form of the workpiece is not particularly limited. In the case where the workpiece is an R—Fe—B based permanent magnet, it may be magnet scrap, magnet processing waste, or the like discharged in the production process. In order for the workpiece to be sufficiently oxidation-treated, it is preferable that the workpiece is in granular or powder form having a particle size of 500 μm or less (in view of the ease of preparation, for example, the lower limit of the particle size is preferably 1 μm). However, the entire workpiece does not necessarily have to be in such granular or powder form, and it is possible that part of the workpiece is in granular or powder form.

In the case where the workpiece containing at least a rare earth element and an iron group element, to which the method of the present invention is to be applied, contains boron as an additional element, such as in the case of an R—Fe—B based permanent magnet, boron is somewhat contained in an oxide of a rare earth element recovered by separation from an alloy of an iron group element and carbon by the method of the present invention. When such a boron-containing oxide of a rare earth element is reduced by molten salt electrolysis using fluorine-containing molten salt components, boron contained in the oxide of a rare earth element may react with fluorine to produce harmful boron fluoride. Therefore, in such a case, it is preferable to previously reduce the boron content of the oxide of a rare earth element. The boron content of a boron-containing oxide of a rare earth element can be reduced, for example, by heat-treating the boron-containing oxide of a rare earth element together with a carbonate of an alkali metal (lithium carbonate, sodium carbonate, potassium carbonate, etc.) in the presence of carbon. The heat treatment in the presence of carbon may be performed at 1300° C. to 1600° C. using graphite (black lead or plumbago), charcoal, coke, coal, diamond, or the like as a carbon supply source, for example. The heat treatment time is suitably 30 minutes to 5 hours, for example. It is advantageous to use a carbon crucible in the heat treatment, because the carbon crucible serves as a treatment container and also as a carbon supply source from the surface thereof (needless to say, this does not discourage the further addition of other carbon supply sources). The amount of alkali metal carbonate used may be 0.1 parts by weight to 2 parts by weight per part by weight of a boron-containing oxide of a rare earth element, for example.

EXAMPLES

Hereinafter, the present invention will be described in detail with reference to the examples, but the following descriptions are not to be construed as restrictive.

Reference Example 1

Figure 2:
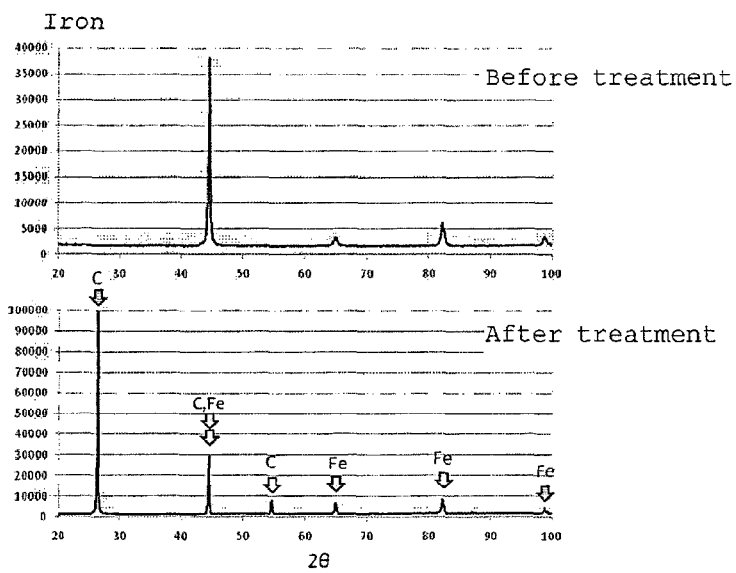
FIG. 2 Similarly, it shows the results of X-ray diffraction of iron before and after the heat treatment.
Figure 3:
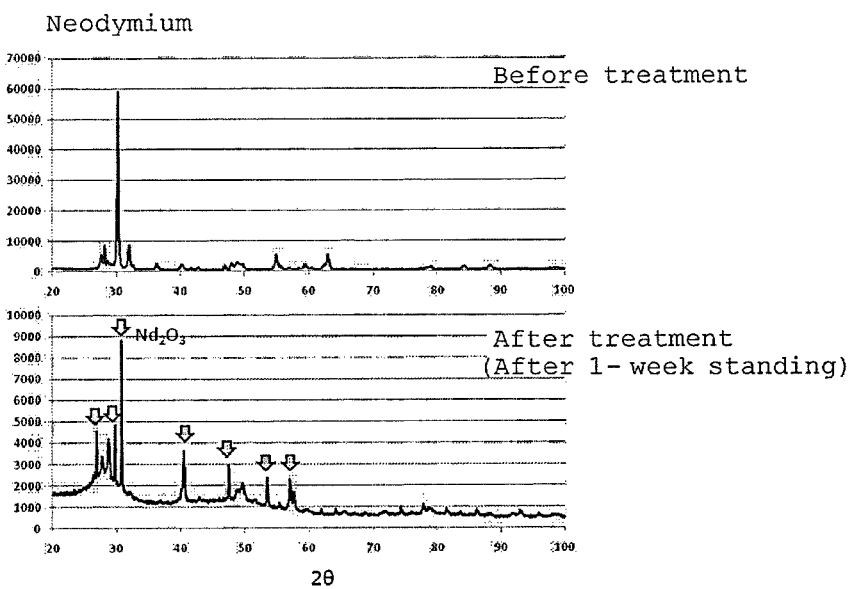
FIG. 3 Similarly, it shows the results of X-ray diffraction of neodymium before and after the heat treatment.
Figure 4:
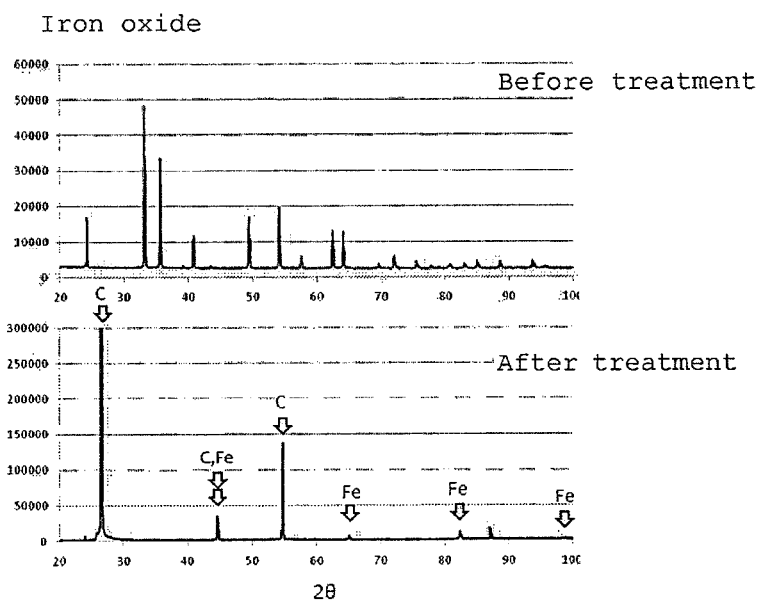
FIG. 4 Similarly, it shows the results of X-ray diffraction of iron oxide before and after the heat treatment.
Figure 5:
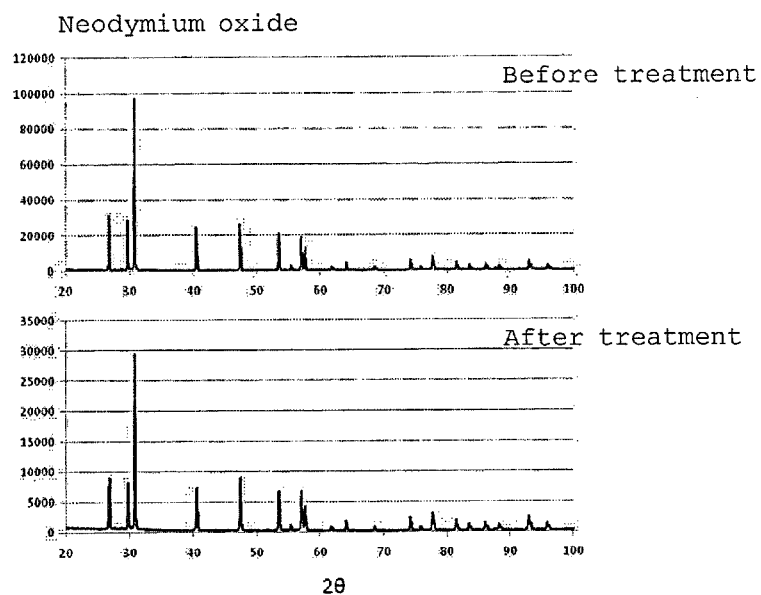
FIG. 5 Similarly, it shows the results of X-ray diffraction of neodymium oxide before and after the heat treatment.

2.00 g of a mass of iron, a mass of neodymium, a powder of iron oxide, and a powder of neodymium oxide were each placed in a carbon crucible having a dimension of 36 mm in outer diameter×10 mm in height×5 mm in thickness (the same hereinafter) and then subjected to a heat treatment in an industrial argon gas atmosphere (oxygen content: 0.2 ppm, flow rate: 10 L/min, the same hereinafter) at 1450° C. for 1 hour. Property changes resulting from a heat treatment using a carbon crucible as a carbon supply source were thus examined. FIG. 1 shows the results of changes in appearance, and FIGS. 2 to 5 each show the results of X-ray diffraction before and after the heat treatment (apparatus used: RINT 2400 manufactured by Rigaku Corporation). With respect to iron, as is clear from FIG. 2, no change was observed in the crystal structure after the heat treatment, but the presence of carbon was observed. In addition, as is clear from FIG. 1, change in appearance due to the melting of iron as a result of the heat treatment was observed. These results were considered to be attributable to the following: iron dissolved carbon to form an alloy, whereby the melting point decreased, resulting in melting. With respect to neodymium, as is clear from FIG. 1 and FIG. 3, when allowed to stand in ambient atmosphere after the heat treatment, it was converted into neodymium oxide. At this time, the product after the heat treatment collapsed with an offensive odor. These results were considered to be attributable to the following: neodymium once underwent property change as a result of the heat treatment in the presence of carbon, and then, when allowed to stand in ambient atmosphere, it was oxidized by moisture in ambient atmosphere, eventually resulting in conversion into neodymium oxide. With respect to iron oxide, as is clear from FIG. 1 and FIG. 4, the same phenomenon as in the case of iron was observed as a result of the heat treatment. This was considered to be attributable to the following: iron oxide was reduced by carbon into iron, and then iron dissolved carbon to form an alloy, whereby the melting point decreased, resulting in melting. With respect to neodymium oxide, as is clear from FIG. 1 and FIG. 5, no property change was observed as a result of the heat treatment in the presence of carbon. These results clarify the difference in property changes resulting from a heat treatment in the presence of carbon between an oxide of a rare earth element (neodymium oxide) and an oxide of an iron group element (iron oxide). This supports the fact that a rare earth element can be separated in the form of an oxide from iron in the following Examples.

Example 1

Processing waste having a particle size of about 10 μm produced in the R—Fe—B based permanent magnet production process (stored in water for seven days to prevent spontaneous ignition) was dehydrated by suction filtration, and then fire was set in ambient atmosphere to burn the waste, thereby performing an oxidation treatment. Table 1 shows the results of the ICP analysis of the magnet processing waste thus oxidation-treated (apparatus used: ICPV-1017 manufactured by Shimadzu Corporation, the same hereinafter). In addition, as a result of gas analysis (apparatus used: EMGA-550W manufactured by HORIBA Ltd., the same hereinafter), the oxygen molar concentration in the oxidation-treated magnet processing waste was 6.5 times the molar concentration of rare earth elements.

TABLE 1

| Fe | Nd | Pr | Dy | B | Al | Co | Cu | Si | Others |
|---|---|---|---|---|---|---|---|---|---|
| 53.07 | 18.56 | 4.84 | 3.62 | 0.76 | 0.15 | 0.74 | 0.10 | 0.05 | 18.11 |

(unit: mass %)

Figure 6:
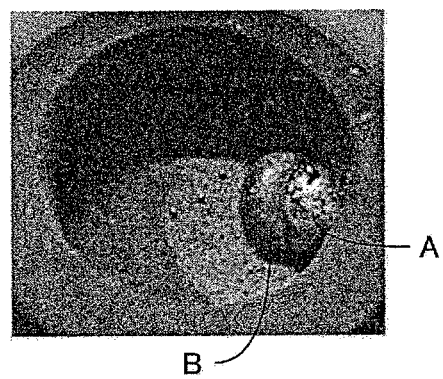
FIG. 6 It shows the inside of a carbon crucible after the heat treatment of oxidation-treated magnet processing waste in the presence of carbon in Example 1 (two types of masses are present).
Figure 6:
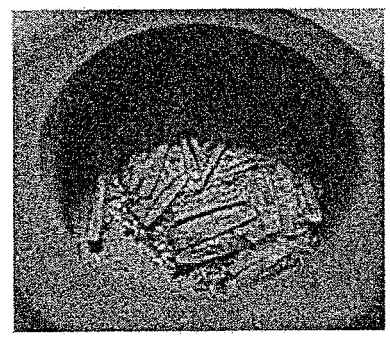

Next, 2.00 g of the oxidation-treated magnet processing waste was placed in a carbon crucible and then subjected to a heat treatment in an industrial argon gas atmosphere at 1450° C. for 1 hour. Subsequently, the carbon crucible was furnace-cooled to room temperature. As a result, in the carbon crucible, two types of masses (mass A and mass B) adhering thereto were present (FIG. 6). The mass A and the mass B were each analyzed using SEM-EDX (S800 manufactured by Hitachi High-Technologies Corporation, the same hereinafter). The results are shown in Table 2. As is clear from Table 2, the main component of the mass A was iron, while the main components of the mass B were rare earth elements, showing that rare earth elements had been separated in the form of oxides from iron. The purity of the rare earth elements in the mass B excluding oxygen was 98.7%.

TABLE 2

| | Fe | Nd | Pr | Dy | O | C | Others |
|---|---|---|---|---|---|---|---|
| Mass A | 98.0 | — | — | — | — | 2.0 | — |
| Mass B | — | 50.5 | 14.0 | 10.1 | 24.4 | — | 1.0 |

(unit: mass %, —: below detection limit)

Example 2

The magnet processing waste burned in Example 1 was further subjected to a heat treatment in ambient atmosphere at 860° C. for 2 hours to perform an oxidation treatment. As a result of gas analysis, the oxygen molar concentration in the oxidation-treated magnet processing waste was 10.5 times the molar concentration of rare earth elements. Next, in the same manner as in Example 1, the oxidation-treated magnet processing waste was placed in a carbon crucible, subjected to a heat treatment, and then furnace-cooled to room temperature. As a result, in the carbon crucible, two types of masses (mass A and mass B) adhering thereto were present. Table 3 shows the results of the analysis of the mass A and the mass B using SEM-EDX. As is clear from Table 3, the main component of the mass A was iron, while the main components of the mass B were rare earth elements, showing that rare earth elements had been separated in the form of oxides from iron. The purity of the rare earth elements in the mass B excluding oxygen was 98.1%.

TABLE 3

| | Fe | Nd | Pr | Dy | O | C | Others |
|---|---|---|---|---|---|---|---|
| Mass A | 97.3 | — | — | — | — | 2.7 | — |
| Mass B | — | 48.8 | 14.3 | 9.9 | 25.6 | — | 1.4 |

(unit: mass %, —: below detection limit)

Comparative Example 1

Using, in place of the magnet processing waste oxidation-treated in Example 1, a non-oxidation-treated prismatic magnet having a dimension of 10 mm in length×1 mm in width×1 mm in thickness (the composition is the same as the processing waste), the magnet was placed in a carbon crucible, subjected to a heat treatment, and then furnace-cooled to room temperature in the same manner as in Example 1. However, two types of masses were not formed in the carbon crucible, and it was impossible to separate rare earth elements in the form of oxides from iron (FIG. 7). Incidentally, when allowed to stand in ambient atmosphere, the heat-treated magnet collapsed with an offensive odor. These results show that in the case where the method described in Patent Document 2 is implemented using an industrial argon gas having an oxygen content of 0.2 ppm, rare earth elements and iron cannot be separated.

Comparative Example 2

An ingot for magnets having the composition shown in Table 4 was ground to a particle size of about 500 μm. 2.00 g of the obtained ground product was, without an oxidation treatment, placed in a carbon crucible, subjected to a heat treatment, and then furnace-cooled to room temperature in the same manner as in Example 1. However, two types of masses were not formed in the carbon crucible, and it was impossible to separate rare earth elements in the form of oxides from iron. Incidentally, when allowed to stand in ambient atmosphere, the heat-treated ground product collapsed with an offensive odor. These results show that in the case where the method described in Patent Document 2 is implemented using an industrial argon gas having an oxygen content of 0.2 ppm, rare earth elements and iron cannot be separated.

TABLE 4

| Fe | Nd | Pr | Dy | B | Al | Co | Cu | Si | Others |
|---|---|---|---|---|---|---|---|---|---|
| 65.3 | 22.8 | 0.1 | 8.6 | 0.9 | 0.2 | 0.9 | 0.1 | 0.02 | 1.08 |

(unit: mass %)

Example 3

5.00 g of the magnet processing waste oxidation-treated in Example 2 and 5.00 g of a non-oxidation-treated prismatic magnet having a dimension of 10 mm in length×1 mm in width×1 mm in thickness (the composition is the same as the processing waste), 10.00 g in total (the oxygen molar concentration as a whole was 5.3 times the molar concentration of rare earth elements), were placed in a carbon crucible, subjected to a heat treatment, and then furnace-cooled to room temperature in the same manner as in Example 1. As a result, in the carbon crucible, two types of masses (mass A and mass B) adhering thereto were present. Table 5 shows the results of the analysis of the mass A and the mass B using SEM-EDX. As is clear from Table 5, the main component of the mass A was iron, while the main components of the mass B were rare earth elements, showing that rare earth elements had been separated in the form of oxides from iron. The purity of the rare earth elements in the mass B excluding oxygen was 86.2%.

TABLE 5

| | Fe | Nd | Pr | Dy | O | C | Others |
|---|---|---|---|---|---|---|---|
| Mass A | 98.0 | — | — | — | — | 2.0 | — |
| Mass B | — | 54.8 | 14.8 | 3.6 | 15.1 | — | 11.7 |

(unit: mass %, —: below detection limit)

Example 4

5.00 g of the magnet processing waste oxidation-treated in Example 2 and 4.97 g of a non-oxidation-treated cylindrical magnet having a dimension of 2 mm in diameter×5 mm in height (the composition is the same as the processing waste) having a nickel-plating film on the surface thereof, 9.97 g in total (the oxygen molar concentration as a whole was 5.3 times the molar concentration of rare earth elements), were placed in a carbon crucible, subjected to a heat treatment, and then furnace-cooled to room temperature in the same manner as in Example 1. As a result, in the carbon crucible, two types of masses (mass A and mass B) adhering thereto were present. Table 6 shows the results of the analysis of the mass A and the mass B using SEM-EDX. As is clear from Table 6, the main component of the mass A was iron, while the main components of the mass B were rare earth elements, showing that rare earth elements had been separated in the form of oxides from iron. The purity of the rare earth elements in the mass B excluding oxygen was 88.5%.

TABLE 6

|  | Fe | Nd | Pr | Dy | O | C | Others |
|---|---|---|---|---|---|---|---|
| Mass A | 95.5 | — | — | — | — | 1.5 | 3.0 |
| Mass B | — | 57.7 | 15.7 | 4.4 | 12.1 | — | 10.1 |

(unit: mass %, —: below detection limit)

Example 5

The ground product prepared in Comparative Example 2 was subjected to a heat treatment in ambient atmosphere at 350° C. for 1 hour to perform an oxidation treatment. As a result of gas analysis, the oxygen molar concentration in the oxidation-treated ground product was 2.3 times the molar concentration of rare earth elements. Next, 10.00 g of the oxidation-treated ground product was placed in a carbon crucible, subjected to a heat treatment, and then furnace-cooled to room temperature in the same manner as in Example 1. As a result, in the carbon crucible, two types of masses (mass A and mass B) adhering thereto were present. Table 7 shows the results of the analysis of the mass A and the mass B using SEM-EDX. As is clear from Table 7, the main component of the mass A was iron, while the main components of the mass B were rare earth elements, showing that rare earth elements had been separated in the form of oxides from iron. The purity of the rare earth elements in the mass B excluding oxygen was 98.0%.

TABLE 7

|  | Fe | Nd | Pr | Dy | O | C | Others |
|---|---|---|---|---|---|---|---|
| Mass A | 98.2 | — | — | — | — | 1.8 | — |
| Mass B | — | 64.5 | — | 23.9 | 9.8 | — | 1.8 |

(unit: mass %, —: below detection limit)

Example 6

The ground product prepared in Comparative Example 2 was subjected to a heat treatment in ambient atmosphere at 400° C. for 1 hour to perform an oxidation treatment. As a result of gas analysis, the oxygen molar concentration in the oxidation-treated ground product was 3.1 times the molar concentration of rare earth elements. Next, 5.00 g of the oxidation-treated ground product was placed in a carbon crucible, subjected to a heat treatment, and then furnace-cooled to room temperature in the same manner as in Example 1. As a result, in the carbon crucible, two types of masses (mass A and mass B) adhering thereto were present. Table 8 shows the results of the analysis of the mass A and the mass B using SEM-EDX. As is clear from Table 8, the main component of the mass A was iron, while the main components of the mass B were rare earth elements, showing that rare earth elements had been separated in the form of oxides from iron. The purity of the rare earth elements in the mass B excluding oxygen was 97.8%.

TABLE 8

|  | Fe | Nd | Pr | Dy | O | C | Others |
|---|---|---|---|---|---|---|---|
| Mass A | 97.5 | — | — | — | — | 2.5 | — |
| Mass B | — | 50.6 | — | 21.2 | 26.6 | — | 1.6 |

(unit: mass %, —: below detection limit)

Example 7

The ground product prepared in Comparative Example 2 was subjected to a heat treatment in ambient atmosphere at 600° C. for 1 hour to perform an oxidation treatment. As a result of gas analysis, the oxygen molar concentration in the oxidation-treated ground product was 5.2 times the molar concentration of rare earth elements. Next, 10.00 g of the oxidation-treated ground product was placed in a carbon crucible, subjected to a heat treatment, and then furnace-cooled to room temperature in the same manner as in Example 1. As a result, in the carbon crucible, two types of masses (mass A and mass B) adhering thereto were present. Table 9 shows the results of the analysis of the mass A and the mass B using SEM-EDX. As is clear from Table 9, the main component of the mass A was iron, while the main components of the mass B were rare earth elements, showing that rare earth elements had been separated in the form of oxides from iron. The purity of the rare earth elements in the mass B excluding oxygen was 98.2%.

TABLE 9

|  | Fe | Nd | Pr | Dy | O | C | Others |
|---|---|---|---|---|---|---|---|
| Mass A | 97.9 | — | — | — | — | 2.1 | — |
| Mass B | — | 54.6 | — | 20.1 | 23.9 | — | 1.4 |

(unit: mass %, —: below detection limit)

Example 8

The ground product prepared in Comparative Example 2 was subjected to a heat treatment in ambient atmosphere at 900° C. for 1 hour to perform an oxidation treatment. As a result of gas analysis, the oxygen molar concentration in the oxidation-treated ground product was 10.5 times the molar concentration of rare earth elements. Next, 10.00 g of the oxidation-treated ground product was placed in a carbon crucible, subjected to a heat treatment, and then furnace-cooled to room temperature in the same manner as in Example 1. As a result, in the carbon crucible, two types of masses (mass A and mass B) adhering thereto were present. Table 10 shows the results of the analysis of the mass A and the mass B using SEM-EDX. As is clear from Table 10, the main component of the mass A was iron, while the main components of the mass B were rare earth elements, showing that rare earth elements had been separated in the form of oxides from iron. The purity of the rare earth elements in the mass B excluding oxygen was 97.3%.

TABLE 10

|  | Fe | Nd | Pr | Dy | O | C | Others |
|---|---|---|---|---|---|---|---|
| Mass A | 97.4 | — | — | — | — | 2.6 | — |
| Mass B | — | 54.1 | — | 17.8 | 26.1 | — | 2.0 |

(unit: mass %, —: below detection limit)

Example 9

Two types of masses adhering to a carbon crucible (mass A and mass B) were obtained in the same manner as in Example 1, except that the heat treatment of oxidation-treated magnet processing waste in the presence of carbon was performed at 1400° C. for 1 hour. Table 11 shows the results of the analysis of the mass A and the mass B using SEM-EDX. As is clear from Table 11, the main component of the mass A was iron, while the main components of the mass B were rare earth elements, showing that rare earth elements had been separated in the form of oxides from iron. The purity of the rare earth elements in the mass B excluding oxygen was 97.0%.

TABLE 11

|        | Fe   | Nd   | Pr   | Dy   | O    | C   | Others |
|--------|------|------|------|------|------|-----|--------|
| Mass A | 98.0 | —    | —    | —    | —    | 2.0 | —      |
| Mass B | —    | 46.8 | 12.8 | 10.6 | 27.6 | —   | 2.2    |

(unit: mass %, —: below detection limit)

Example 10

5.00 g of the magnet processing waste oxidation-treated in Example 2 and 1.00 g of a carbon powder (graphite powder) (equivalent to 1.8 times the moles of iron contained in the magnet processing waste) were placed in an alumina crucible having a dimension of 50 mm in outer diameter×50 mm in height×2 mm in thickness, and then subjected to a heat treatment in an industrial argon gas atmosphere at 1450° C. for 1 hour. Subsequently, the alumina crucible was furnace-cooled to room temperature. As a result, in the alumina crucible, two types of masses (mass A and mass B) adhering thereto were present, as well as excess carbon powder. Table 12 shows the results of the analysis of the mass A and the mass B using SEM-EDX. As is clear from Table 12, the main component of the mass A was iron, while the main components of the mass B were rare earth elements, showing that rare earth elements had been separated in the form of oxides from iron. The purity of the rare earth elements in the mass B excluding oxygen was 91.8%.

TABLE 12

|        | Fe   | Nd   | Pr   | Dy  | O   | C   | Others |
|--------|------|------|------|-----|-----|-----|--------|
| Mass A | 95.3 | —    | —    | —   | —   | 4.7 | —      |
| Mass B | —    | 59.4 | 14.1 | 9.8 | 9.3 | —   | 7.4    |

(unit: mass %, —: below detection limit)

Example 11

The carbon crucible having two types of masses (mass A and mass B) adhering thereto obtained in Example 1 was heat-treated in an upside-down position in an industrial argon gas atmosphere at 1350° C. for 1 hour. As a result, both masses melted, and only a melt of the mass B having rare earth elements as main components dropped into an alumina crucible used as a receiver, and adhered thereto in the form of a mass. Table 13 shows the recovery of the rare earth elements thus recovered in the form of the mass adhering to the alumina crucible from the magnet processing waste, which is a workpiece, as well as the purity of the rare earth elements in the mass excluding oxygen. In addition, the carbon crucibles having two types of masses adhering thereto obtained in Examples 2, 6, 7, 8, and 9 were each subjected to the above heat treatment; also Table 13 shows the recovery of the rare earth elements thus recovered in the form of a mass adhering to an alumina crucible from the magnet processing waste or the ground product of an ingot for magnets, which is a workpiece, as well as the purity of the rare earth elements in the mass excluding oxygen. As is clear from Table 13, when the carbon crucibles having two types of masses adhering thereto obtained in Examples were subjected to the above heat treatment, in each case, the mass of which the purity of the rare earth elements excluding oxygen is more than 95% was obtained in the alumina crucible. In the case where the carbon crucible having two types of masses adhering thereto obtained in Example 2 or 8 was subjected to the above heat treatment, the recovery was lower than other cases. This was considered to be attributable to the following: because the workpiece had been highly oxidation-treated, heat was significantly generated during the heat treatment in the presence of carbon, whereby part of the melt was finely dispersed.

TABLE 13

|           | Recovery (%) | Purity (%) |
|-----------|--------------|------------|
| Example 1 | 93.6         | 98.7       |
| Example 2 | 42.0         | 98.1       |
| Example 6 | 79.8         | 97.8       |
| Example 7 | 80.6         | 98.2       |
| Example 8 | 63.0         | 97.3       |
| Example 9 | 94.2         | 97.0       |

Comparative Example 3

About 10 g of the magnet processing waste of Example 1 was washed with pure water and then dried on a hot plate at 80° C. over 1 hour. 5.00 g of the obtained dry waste was, without an oxidation treatment, placed in a carbon crucible, subjected to a heat treatment, and then furnace-cooled to room temperature in the same manner as in Example 1. However, two types of masses were not formed in the carbon crucible, and it was impossible to separate rare earth elements in the form of oxides from iron. Incidentally, when allowed to stand in ambient atmosphere, the heat-treated dry waste collapsed with an offensive odor. These results show that in the case where the method described in Patent Document 2 is implemented using an industrial argon gas having an oxygen content of 0.2 ppm, rare earth elements and iron cannot be separated.

Example 12

Two types of masses (mass A and mass B) were obtained in a carbon crucible in the same manner as in Example 1, except that 20.0 g of oxidation-treated magnet processing waste was placed in a carbon crucible having a dimension of 70 mm in outer diameter×70 mm in height×10 mm in thickness and then subjected to a heat treatment in an industrial argon gas atmosphere at 1600° C. for 1 hour. The mass A was analyzed using SEM-EDX, while the mass B was analyzed using ICP. The results are shown in Table 14. As is clear from Table 14, the main component of the mass A was iron, while the main components of the mass B were rare earth elements, showing that rare earth elements had been separated in the form of oxides from iron.

TABLE 14

|        | Fe   | Nd   | Pr   | Dy   | B   | Al  | Si  | O    | C    | Others |
|--------|------|------|------|------|-----|-----|-----|------|------|--------|
| Mass A | 86.3 | —    | —    | —    | —   | —   | —   | 2.0  | 11.6 | 0.1    |
| Mass B | 0.0  | 53.2 | 13.7 | 10.1 | 1.6 | 0.5 | 0.0 | 11.8 | 1.7  | 7.4    |

(unit: mass %, —: below detection limit)

Example 13

3.00 g of the mass B obtained in Example 1 was well ground using an agate mortar and an agate pestle, then, together with 1.50 g of lithium carbonate, placed in a carbon crucible having a dimension of 36 mm in outer diameter×10 mm in height×5 mm in thickness, and subjected to a heat treatment in an industrial argon gas atmosphere at 1450° C. for 1 hour. The ground product of the mass B before the heat treatment and the ground product after the heat treatment were each analyzed using ICP. As a result, the boron content of the ground product of the mass B before the heat treatment was 2.30 mass %, while the boron content of the ground product after the heat treatment was 1.99 mass %, showing that when a boron-containing oxide of a rare earth element is subjected to a heat treatment together with lithium carbonate in the presence of carbon, the boron content thereof can be reduced.

Example 14

3.00 g of the mass B obtained in Example 1 was well ground using an agate mortar and an agate pestle, then, together with 0.48 g of potassium carbonate, placed in a carbon crucible having a dimension of 36 mm in outer diameter×10 mm in height×5 mm in thickness, and subjected to a heat treatment in an industrial argon gas atmosphere at 1450° C. for 5 hours. The ground product of the mass B before the heat treatment and the ground product after the heat treatment were each analyzed using ICP. As a result, the boron content of the ground product of the mass B before the heat treatment was 2.30 mass %, while the boron content of the ground product after the heat treatment was 1.69 mass %, showing that when a boron-containing oxide of a rare earth element is subjected to a heat treatment together with potassium carbonate in the presence of carbon, the boron content thereof can be reduced.

INDUSTRIAL APPLICABILITY

According to the present invention, a method for recovering a rare earth element from a workpiece containing at least a rare earth element and an iron group element, which can be put into practical use as a low-cost, simple recycling system, can be provided. In this respect, the present invention is industrially applicable.

The invention claimed is:

1. A method for recovering a rare earth element from a workpiece containing at least a rare earth element and an iron group element, characterized by including at least a step of separating a rare earth element in the form of an oxide from an iron group element by subjecting a workpiece to an oxidation treatment, then turning the treatment environment into an environment where carbon is present, and subjecting the oxidation-treated workpiece to a heat treatment at a temperature of 1150° C. or more,
    wherein after the oxidation treatment, the molar concentration of oxygen in the workpiece is at least 2.0 times more than the molar concentration of the rare earth element.
2. The method according to claim 1, characterized in that in the heat treatment of the oxidation-treated workpiece in the presence of carbon, a carbon crucible is used as a treatment container and a carbon supply source.
3. The method according to claim 1, characterized in that in the heat treatment of the oxidation-treated workpiece in the presence of carbon, a carbon supply source is added to a non-carbon treatment container.
4. The method according to claim 1, characterized in that at least part of the workpiece is in granular or powder form having a particle size of 500 μm or less.
5. The method according to claim 1, characterized in that the workpiece is an R—Fe—B based permanent magnet.
6. The method according to claim 5, characterized in that the step of separating a rare earth element in the form of an oxide from an iron group element is followed by a step of reducing the boron content of the oxide of the rare earth element by subjecting the oxide of the rare earth element to a heat treatment together with a carbonate of an alkali metal in the presence of carbon.
7. A method for reducing the boron content of a boron-containing oxide of a rare earth element, characterized in that a boron-containing oxide of a rare earth element is subjected to a heat treatment together with a carbonate of an alkali metal in the presence of carbon.

* * * * *